United States Patent [19]
Rischen et al.

[11] Patent Number: 5,658,056
[45] Date of Patent: Aug. 19, 1997

[54] ANTI-LOCK DEVICE FOR A HYDRAULIC VEHICLE BRAKE SYSTEM

[75] Inventors: Dietmar Rischen, Vaihingen/Enz; Carsten Pabst; Roland Benzinger, both of Stuttgart, all of Germany; Michael Krauter, Charleston, S.C.; Hiroaki Atsushi, Stuttgart, Germany

[73] Assignee: Robert Bosch GmbH, Stuttgart, Germany

[21] Appl. No.: 522,721

[22] Filed: Sep. 1, 1995

[30] Foreign Application Priority Data

Sep. 2, 1994 [DE] Germany .................. 44 31 250.4

[51] Int. Cl.⁶ .............. B60T 8/32; B60T 8/36; B60T 8/48; F04B 1/04
[52] U.S. Cl. ........................ 303/119.2; 303/113.1
[58] Field of Search ............ 303/119.2, 113.1, 303/116.4, 113.2, 119.1, 116.1; 137/886; 439/34

[56] References Cited

U.S. PATENT DOCUMENTS 5,244,262  9/1993  Kehl et al. ............... 303/119.2
5,466,055  11/1995  Schmitt et al. ........... 303/116.4

*Primary Examiner*—Douglas C. Butler
*Attorney, Agent, or Firm*—Edwin E. Greigg; Ronald E. Greigg

[57] ABSTRACT

An anti-lock device for a hydraulic automobile brake system includes a housing block for receiving an eccentric directional valves, two coaxially oriented pump pistons and first and second storage chambers. So that the housing block can be made narrower, the longitudinal axes (F, G, I, J) are distributed to the corners of a quadrangle. At the same time, the common longitudinal axis (E) of the pump pistons can be located between the longitudinal axes of the storage chambers.

22 Claims, 8 Drawing Sheets

ANTI-LOCK DEVICE FOR A HYDRAULIC VEHICLE BRAKE SYSTEM

PRIOR ART

The invention proceeds from an anti-lock device for a hydraulic vehicle brake system.

The publication U.S. Pat. No. 5,244,262 discloses such an anti-lock device for a hydraulic vehicle brake system, with a housing block having an eccentric space for an excentric rotatable about an axis. Two pump pistons which, oriented coaxially, are arranged mirror-symmetrically to the eccentric are displaceable in pump cylinder bores and the eccentric is driven by a motor. The motor is fastened to a first side of the housing block, with a second side which is located opposite the first side of the housing block and starting from which electrically controllable directional valves for the variation of wheel brake pressures are installed parallel to the axis of rotation of the eccentric. Two first storage chambers are located in bores for the temporary reception of a pressure medium bled out of at least one wheel brake by means of a directional valve. Two second storage chambers are located in bores for the temporary reception of a pressure medium pumped by the pump pistons. Extended longitudinal axes of the first and of the second storage chambers are oriented in parallel and intersecting the longitudinal axes of the pump pistons, the first and the second storage chambers being arranged with their extended longitudinal axes in a common reference plane. In other words, the storage chambers are arranged in a row underneath the two pump pistons and their pump cylinder bores and, in this direction, determine the dimension of the housing block on account of the diameters of the bores and of wall thicknesses which are necessary around these bores. The diameters of the four bores depend on volumetric capacities of the wheel brakes during braking and also depend on how far pressure-medium quantities conveyed in pulses during pumping strokes of the pump pistons are to be equalized in their flow, for example to a brake master cylinder or back to a wheel brake. The result of this may then be that, in the described mode of arrangement of the storage chambers, the housing block of the anti-lock device can no longer be accommodated in the vehicle at a point where the vehicle designer preplanned or can provide an installation space which may be too narrow. The accommodation of the anti-lock device can additionally also be impeded in that hydraulic connecting bores for brake conduits are located on two sides of the housing block which are oriented transversely to the longitudinal axes of the pump pistons, so that, for installation in narrow spaces, brake-conduit screw connections and bends of brake conduits also have to be accommodated.

In a further anti-lock device of this type, known from the publication WO 93/08050, the reservoirs are accommodated identically in a row underneath the pump pistons and pump cylinder bores. One difference is that connecting bores for brake conduits are oriented parallel to a motor driving the eccentric and are located above this motor. This reduces the demand for width of an installation space, for now only the diameters of the storage chambers and the thicknesses of the walls surrounding these determine the dimension of the anti-lock device in terms of width. Nevertheless, even an anti-lock device designed in this way may be difficult or impossible to accommodate in a space preplanned by the vehicle designer.

ADVANTAGES OF THE INVENTION

The advantage of the anti-lock device according to the invention for a hydraulic vehicle brake system, is that, as measured in the direction of the longitudinal extensions of the pump pistons, the housing block can be made smaller and consequently can be accommodated, for example, more easily between a space wall and, for example, a vehicle engine.

Advantageous developments and improvements of the anti-lock device specified herein are possible as a result of the measures listed herein. The defining features of permit largely symmetrical arrangements of the reservoirs in relation to a mid-plane of the housing block imagined as passing through the axis of rotation of the eccentric, so that, for example, the first storage chambers can communicate with the pump cylinders and with receiving holes of solenoid valves by the use of connecting ducts drilled at an identical inclination. This simplifies the design of a production station for making the housing block. The defining features result advantageously in short distances between, in each case, the first and the second reservoir and the associated pump cylinder. The defining features shift the individual reservoirs identically near to the abovementioned imaginary mid-plane of the housing block, thus resulting in a favorable small overall dimension, once against as measured in the longitudinal direction of the pump elements. The defining features of claim 6 afford the advantage of a good venting capacity of the storage chambers and of good accessibility of brake-conduit connecting holes for the purpose of the screw connection to brake conduits. The defining features afford the advantage that, for example, two brake-conduit connections can be removed from the top side of the housing block, with the advantage that, for example, four remaining connecting bores are more readily accessible for the insertion of screw connections and for the tightening of the screw connections by means of a fork wrench. The defining features afford the advantage that, on the one hand, sufficient housing-block volume for accommodating the storage chambers is present in the region underneath the directional valves and, on the other hand, only as much material is accumulated in the region of the directional valves as is necessary for receiving the directional valves and for connecting them to the brake-conduit connecting holes. The defining features afford the advantage that hydraulic and electric components form a constructional unit which can be inserted into the vehicle in one operation. The defining features afford the advantage that electromagnets of the solenoid valves are jointly protected and, if appropriate, can be jointly attached to the directional valves. The defining features result in a space-saving accommodation of elastic suspension elements for the housing block within the contour of this housing block.

The development by means of the defining features makes it possible to execute automatic brakings without the actuation of the brake pedal of a brake master cylinder. Depending on the design of the electric and electronic means arranged under the cover cap or in the housing, the automatic braking can be used for reducing wheel slip or else braking can take place automatically wheel-specifically or axle-specifically for an increase in the lateral slip of the wheel or of the respective wheels, in order to counteract a rotation of the vehicle about the vertical axis, on the occasion of the originally too unequal lateral slip between the front and rear wheels, by a reduction of the difference in lateral slip. On the other hand, brake pressures of differing amount and consequently different brake forces can also be generated in a side-specific manner, for the purpose, for example arbitrarily, of bringing the vehicle thus equipped better into a bend or better out of a bend.

The defining features afford the advantage that, once again, elastomeric elements, provided for the suspension of the developed anti-lock device, are accommodated in a space-saving manner within the contour of the housing block.

The advantage of the anti-lock device having the defining features is that, by the choice of length of the column, the distance of the lower rubber-like element from the two upper rubber-like elements becomes equal to the corresponding distance in the anti-lock device developed for automatic braking and having the taller housing block. This results, in turn, in the advantage that, depending on the desired level of equipment of the vehicle, either the simply designed anti-lock device or the developed anti-lock device can be inserted into one and the same mounting which is installed in the vehicle by the vehicle manufacturer.

BRIEF DESCRIPTION OF THE DRAWINGS

An exemplary embodiment of the anti-lock device according to the invention for a hydraulic vehicle brake system is represented in the drawing and is explained in more detail in the following description.

DETAILED DESCRIPTION OF THE EXEMPLARY EMBODIMENTS

Figure 1:
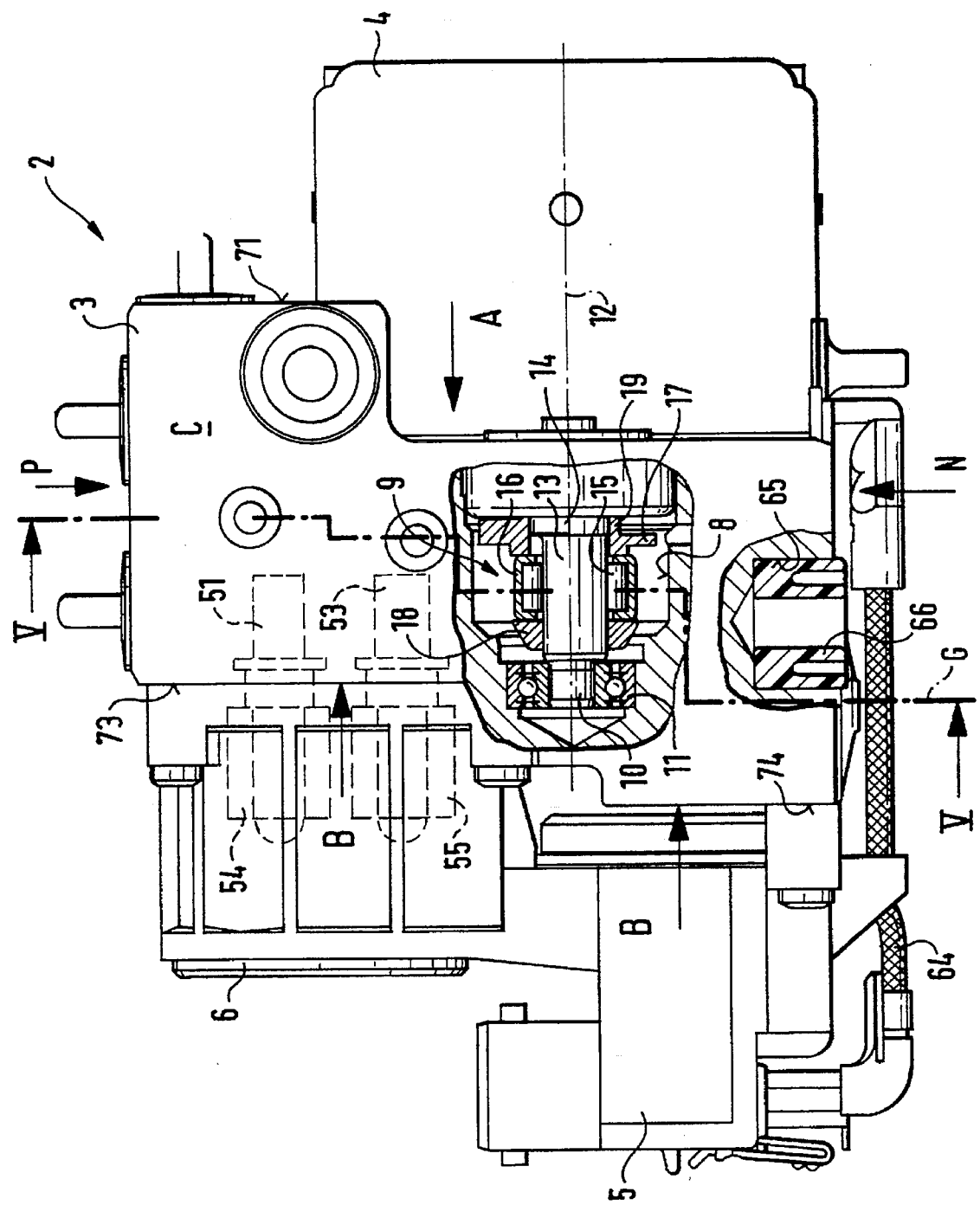
FIG. 1 shows the anti-lock device according to the invention, seen from one side.

The anti-lock device 2 according to the invention comprises, as essential components, a housing block 3 and, attached to the housing block 3, a motor 4, a housing 5 and a cover cap 6.

Figure 2:
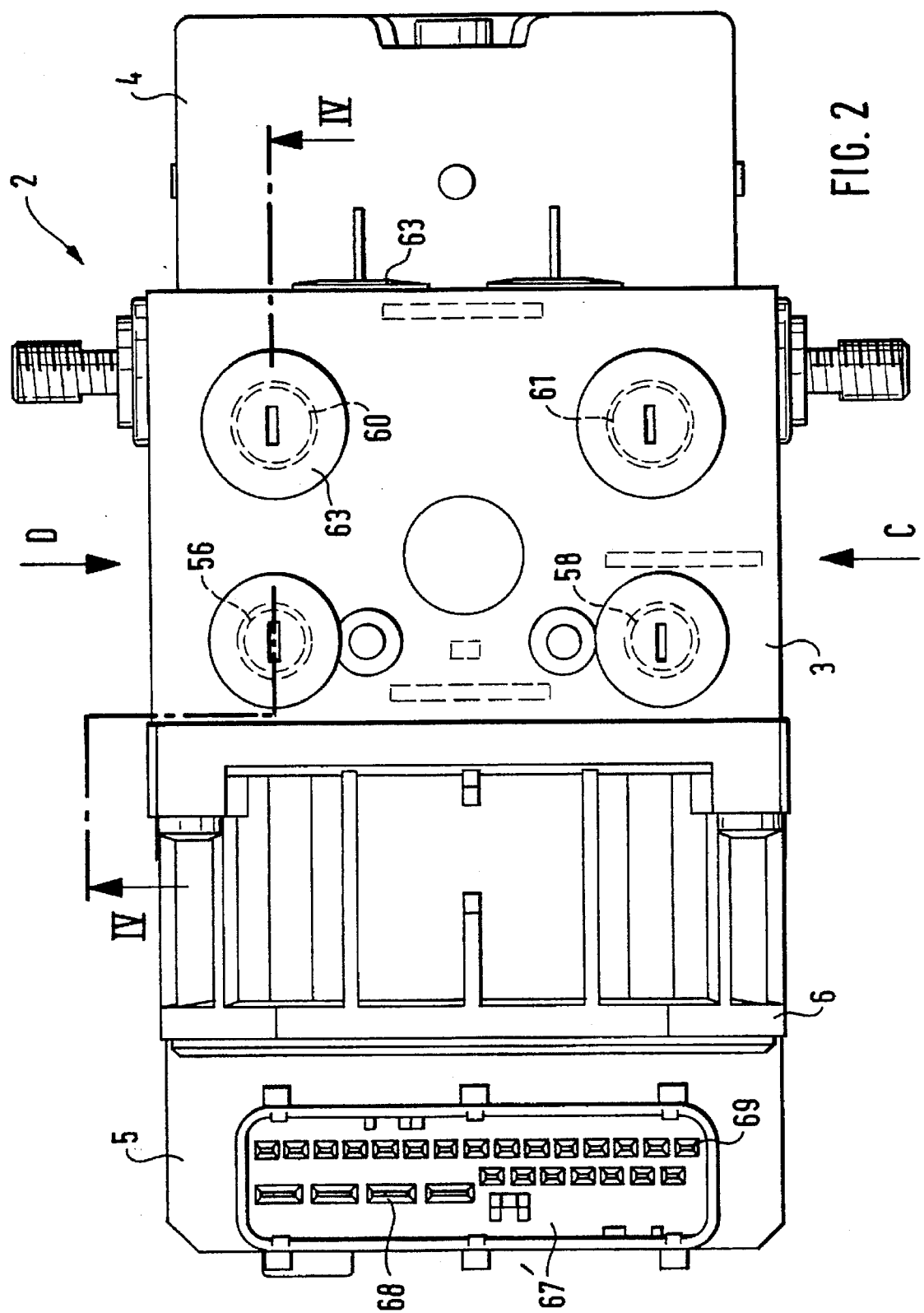
FIG. 2 shows the anti-lock device, as shown in FIG. 1, seen from above.

The anti-lock device 2 is shown in a preferred position of use according to FIGS. 1 and 2, that is to say objects which are shown at the bottom in FIGS. 1 and 2 are also installed towards the bottom in the vehicle. Accordingly, FIG. 2 indicates how the anti-lock device looks from above. In contrast to this, there is, of course, also the possibility of installing the anti-lock device 2 tilted or inclined in any directions. To simplify the description, however, the anti-lock device 2 according to FIGS. 1 and 2, represented as being non-inclined, is taken as a starting point.

In the light of the last sentence above, a first side of the housing block 3 is designated by A. Parallel to and opposite this, a second side is designated by B in FIG. 1. A fastening surface 7 for the motor 4 is located on the side A. A stepped bore 8 extends perpendicularly to this fastening surface 7 into the housing block 3 and delimits an eccentric chamber 9. A shaft journal 10 held by means of a ball-bearing 11 supported by the stepped bore 8 determines an axis of rotation 11 for an eccentric 13 which is made in one piece with a shaft 14. This shaft 14, starting from the eccentric 13, extends into the motor 4. The motor 4 can be equipped, in a way not shown, as a direct current motor with an armature not shown and with a commutator not shown as well as with contact brushes, not shown, which are assigned to the commutator. Since the internal design of the motor is unimportant with regard to the subsequently claimed features essential to the invention, the motor does not need to be described in detail; it also need not be a direct current motor.

Figure 5:
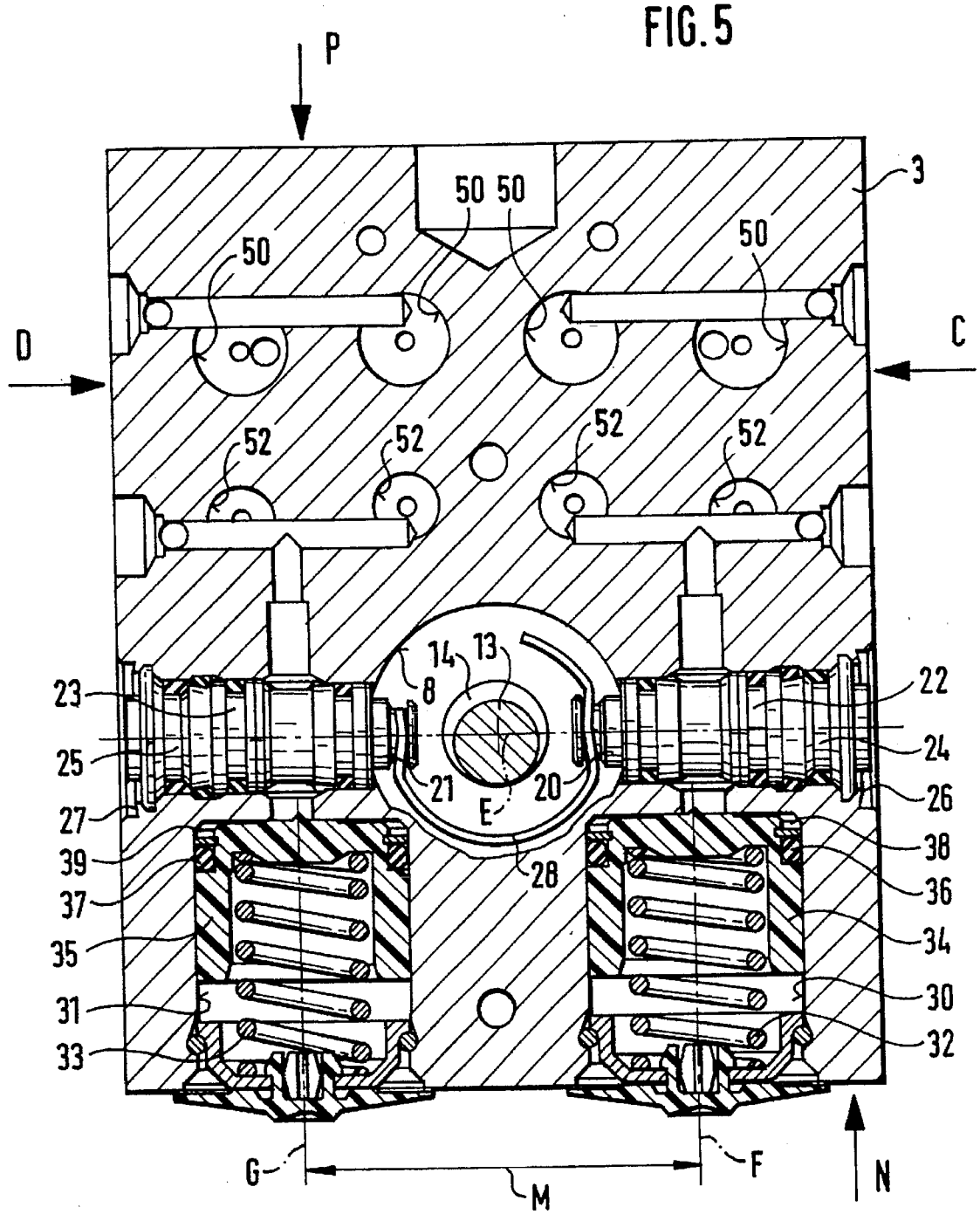
FIG. 5 shows a cross-section through the housing block of the anti-lock device according to the invention, as shown in FIG. 1.

A cross-section through the eccentric 13 is shown in FIG. 5. The shaft 14 following behind the eccentric 13 can also be seen in FIG. 5. Arranged around the eccentric 13 are, for example, needle bearings 15 which are held together by a bearing ring 16. Axial stop means 17, 18 for the bearing ring 16 are provided on both sides of the bearing ring 16. The bearing ring 16 is rotatable relative to the eccentric 13 between these axial stop means 17 and 18. The stop means 17 has a hub 19 which is seated firmly on the shaft 14. The axial stop means 18 is designed in the form of a conical ring and is pressed with a firm fit onto the eccentric 13. Said individual parts are represented in FIG. 1. According to FIG. 5, two pump pistons 20, 21 are provided transversely to the axis of rotation 12 of the eccentric 13 and at the same time coaxially and mirror-symmetrically to the eccentric 13. The pump pistons 20, 21 are displaceable in pump cylinder bores, not shown, which are located in the pump cylinders 22 and 23. The pump cylinders 22 and 23 are combined with outlet valves 24 and 25 and thus altogether form two pump elements effective independently of one another. These pump elements 20, 22, 24 and 21, 23, 25 are fixed in the housing block 3, for example by means of calkings 26, 27. For pressure generation, the pump pistons 20 and 21 are displaceable in their longitudinal directions by means of the eccentric 13, with the bearing needles 15 and the bearing ring 16 being interposed. A C-shaped spring clip 28 hooked firmly on the pump pistons 20 and 21 ensures displacement in each case in the opposite direction. In the region of the calking 26, the housing block 3 has a side C and, opposite, a side D. The sides C and D are to be considered as oriented vertically, and the pump pistons 20, 21 therefore lie in a common horizontal axis E.

Figure 4:
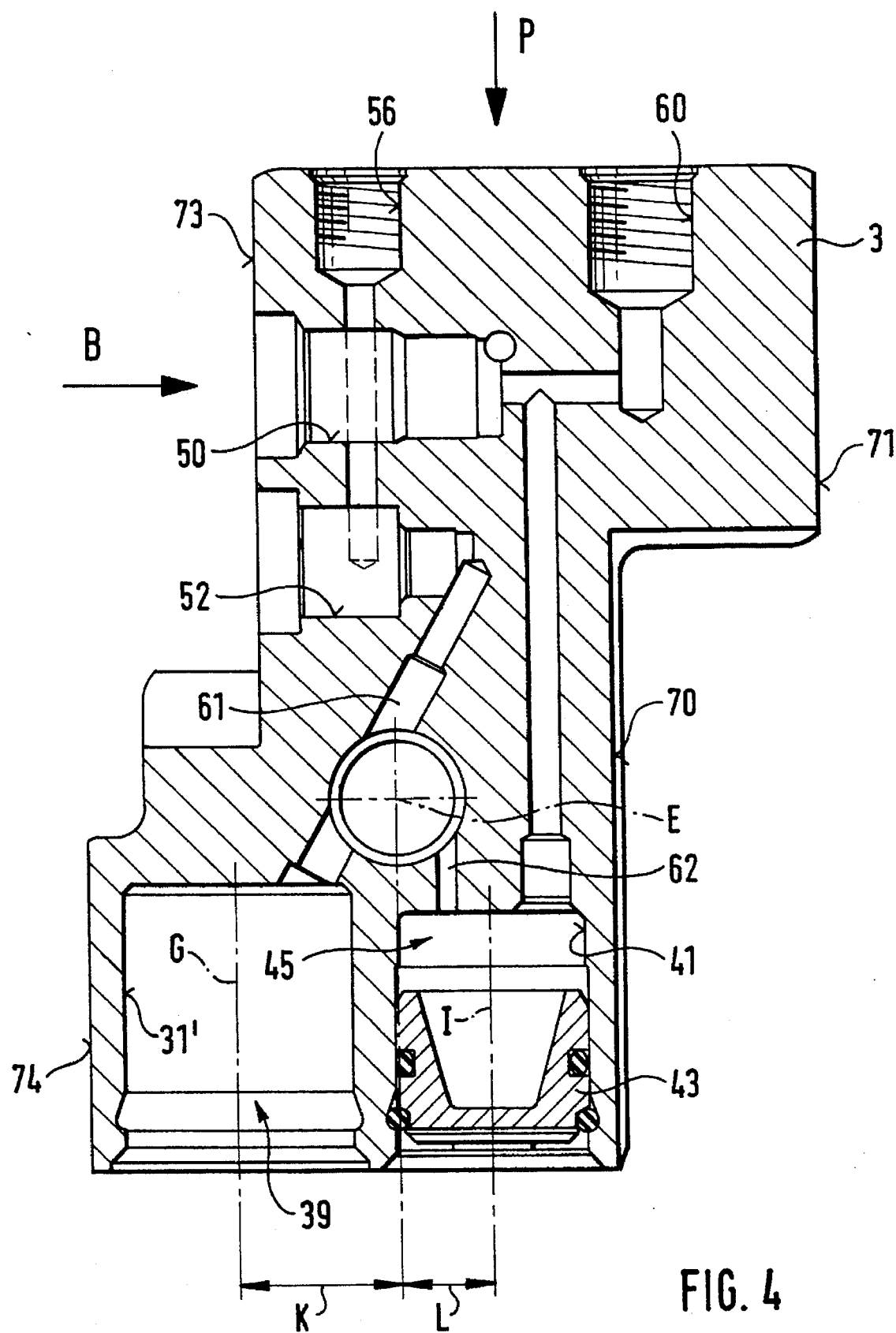
FIG. 4 shows a longitudinal section through a housing block of the anti-lock device according to the invention, as shown in FIG. 1.

In FIG. 5, located underneath the pump elements 20, 22, 24 and 21, 23, 25 are first bores 30, 31 having correspondingly vertical bore axes F and G. Storage pistons 34 and 35 loaded by compression springs 32, 33 are arranged in the bores 30 and 31. Sealing rings 36 and 37 ensure that first storage chambers 38 and 39 separated in a manner sealing them off from the surrounding atmosphere are available for the temporary reception of pressure medium bled out of wheel brakes, not shown, during an anti-lock mode. A bore 31' of enlarged diameter, corresponding to the bore 31, is shown in FIG. 4. In this case, the bore axis G of FIG. 4 is assigned a bore 31'. A storage piston, which differs from the storage piston 35 in an enlarged diameter, is not shown for the sake of simplicity. FIG. 4 also shows the common axis E over the pump elements 20, 22, 24 and 21, 23, 25. In FIG. 1, the bore axis G coincides with the dot-and-dash line of the sectional run from V to V indicated there. Of two second bores, FIG. 4 shows only the bore 41 with its bore axis I. A closing piece 43 is inserted into the bore 41, so that one of two second storage chambers 45 is delimited by this closing piece 43 and by the bore 41.

In FIG. 4, a horizontal distance K is indicated between the axis E of then pump pistons 20, 21 and the longitudinal axis G of the bore 31'. In an identical way, the horizontal distance L is indicated between the axis E and the longitudinal axis I of one of the second bores 41. Looking also at FIG. 5 and the distance M indicated there in the horizontal direction, it emerges that the first and the second storage chambers pass with the longitudinal axes of their bores through the corner points of a quadrangle. The quadrangle can be a trapezium, a rectangle or a square and can be imagined as being, for example, in the plane of a lower side N of the housing block 3.

Figure 3:
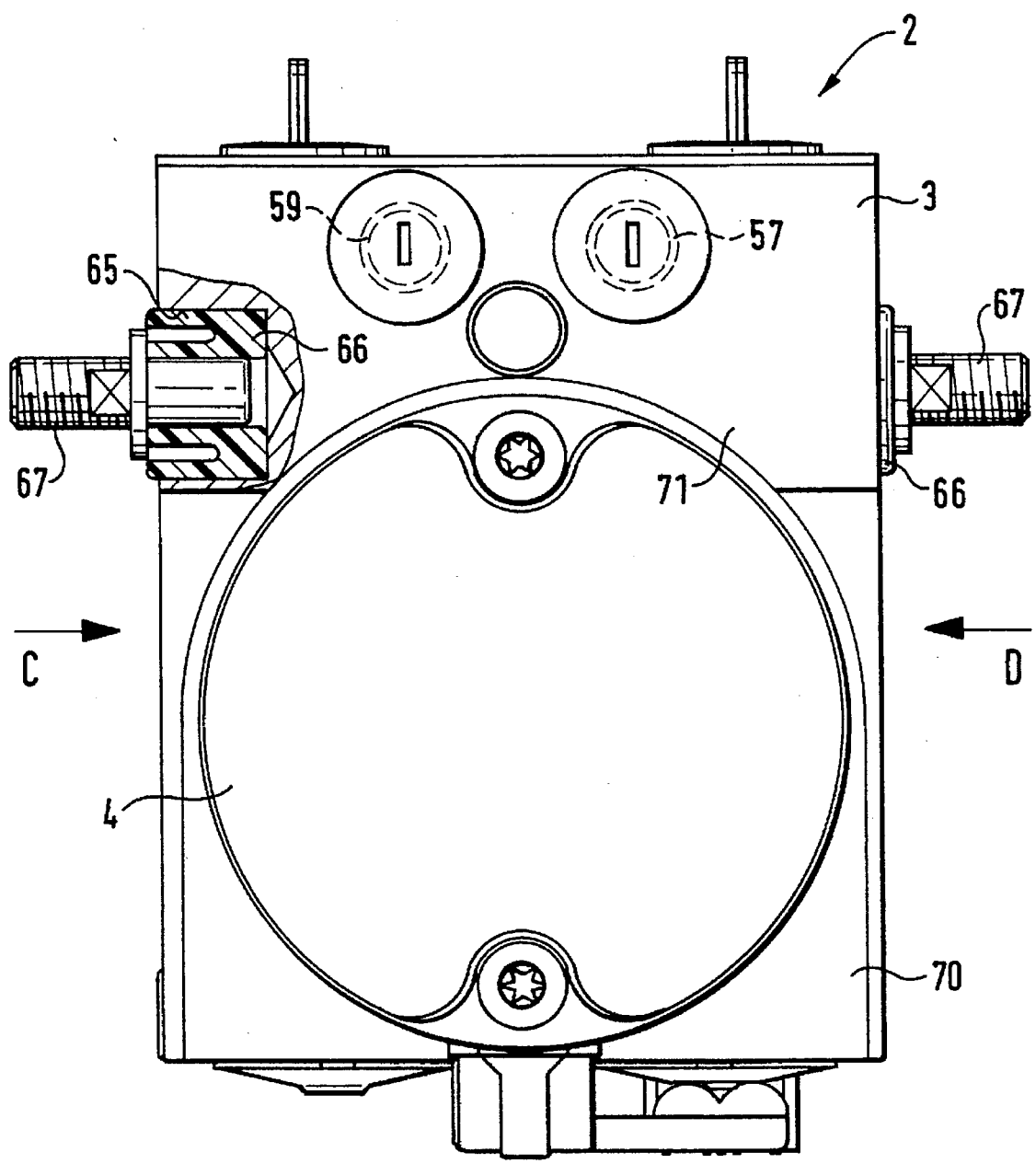
FIG. 3 shows the anti-lock device according to the invention, as shown in FIG. 1, seen from a second side.

FIGS. 4 and 5 show upper stepped bores 50 which start from the side B and are located above the eccentric space 9. According to FIG. 1, directional valves 51 are installed in the upper stepped bores 50. Located underneath the upper stepped bores 50 are lower stepped bores 52, in which further directional valves 53 indicated in FIG. 1 are installed. So that the directional valves 51 and 53 can be controlled electrically, for example electromagnetic coils 54, 55 shown in FIG. 1 are attached to them. As represented in FIG. 4, in each case an upper stepped bore 50 and a lower stepped bore 52 communicate with one another and additionally with a brake-conduit connecting bore 56 which opens into an upper side P of the housing block 3. Another pair of an upper stepped bore 50 and of a lower stepped bore 52 communicates with a further brake-conduit connecting bore 57 which is represented in FIG. 3. In the same way, there are also a further brake-conduit connecting bore 58 and a further brake-conduit connecting bore 59. As can be seen in FIG. 4, the upper stepped bore 50 for an upper directional valve 51 also communicates with a further brake-conduit connection 60 which opens onto the upper side P. As can be seen, furthermore, this brake-conduit connecting bore 60 also communicates with the second storage chamber 45. There is accordingly a further brake-conduit connecting bore 61 in FIG. 2. In FIG. 4, the lower stepped bore 52 is connected to the bore 31' of a first storage chamber 38 by means of an obliquely ascending bore 61. A further bore 62 starts from the second storage chamber 45 and opens into an associated pump element 23. The connection of the individual elements to one another affords the previously known possibility, described in the introductory part of the description, of feeding the pressure, fed to the wheel-brake connecting orifices 60 and 61, in an uninfluenced manner from a brake master cylinder to the brake-conduit connecting bores 56, 57, 58 and 59 and thereby to wheel brakes not shown. The respective wheel brake can be isolated from the brake master cylinder by means of at least one of the directional valves 51. By means of the at least one directional valve 53, the wheel brake not shown can be connected to the bore 31' of a first storage chamber by means of the obliquely ascending bore 61, so that, as a result of the opening of the directional valve 53, brake pressure can be reduced into said storage chamber. The pump element 22 assigned to this first storage chamber empties this storage chamber on the detour through the second storage chamber 45 back to the brake-conduit connection 60 and thereby also back to the brake master cylinder. In FIGS. 1, 2 and 3, the brake-conduit connecting holes 56 to 62 are represented by broken lines, because, in the finished state of the anti-lock device, they are safeguarded, on the way to an automobile manufacturer, against the penetration of dirt by means of closing plugs 63.

Contacting means not shown are located in the cover cap 6 for supplying the electromagnetic coils 54 and 55 with control currents. The contacting means can start, for example, from a control unit not shown. Further control means can be arranged in the housing 5, for example a relay, not shown, for the supply of current to the motor 4 via a cable 64 on the one hand and via the housing block 3 on the other hand.

So that the anti-lock device 2 can be suspended elastically within a vehicle, blindhole-like recesses 65, into which bush-like elastomeric elements 66 are inserted, are located in the sides C and D. Suspension pins 67 penetrate into the elastomeric elements 66. Finally, a blindhole-like bore 65, into which an elastomeric element 66 is likewise inserted, is also drilled, starting from the lower side N. To that extent, the anti-lock device 2 is suspended elastically flexibly and secured sufficiently in position at three suspension points by means of the elastomeric elements 66 identical to one another. For electrical connection to wheel rotation sensors, not shown, which can be taken from the prior art, and to a voltage source, not shown, such as an automobile battery, the housing 5 is designed for receiving a plug for a cable harness not shown, and a strip 67' having different plug contacts 68, 69 is integrated for this purpose into the housing 5.

As is evident particularly clearly from FIG. 4, the housing block 3 has a shape reminiscent of the letter Z. Offset to a surface 70 which is a fastening surface for the motor 4, the housing block 3 has above it a surface 71 which is offset in parallel and from which the brake-conduit connecting bores 57 and 59 start. Opposite this on the side B, the housing block 3 has a surface 73 for the cover 6 and a further surface 74 for attaching the housing 5. The two surfaces 73 and 74 are likewise offset parallel to one another, in FIG. 4 the surface 74 being that which extends furthest to the left, and the surface 71 being that which is nearer to the common axis E. The distribution of these surfaces 70, 71, 73 and 74 is a feature which is essential to the invention and which results in a space-saving design of the anti-lock device 2.

Figure 6:
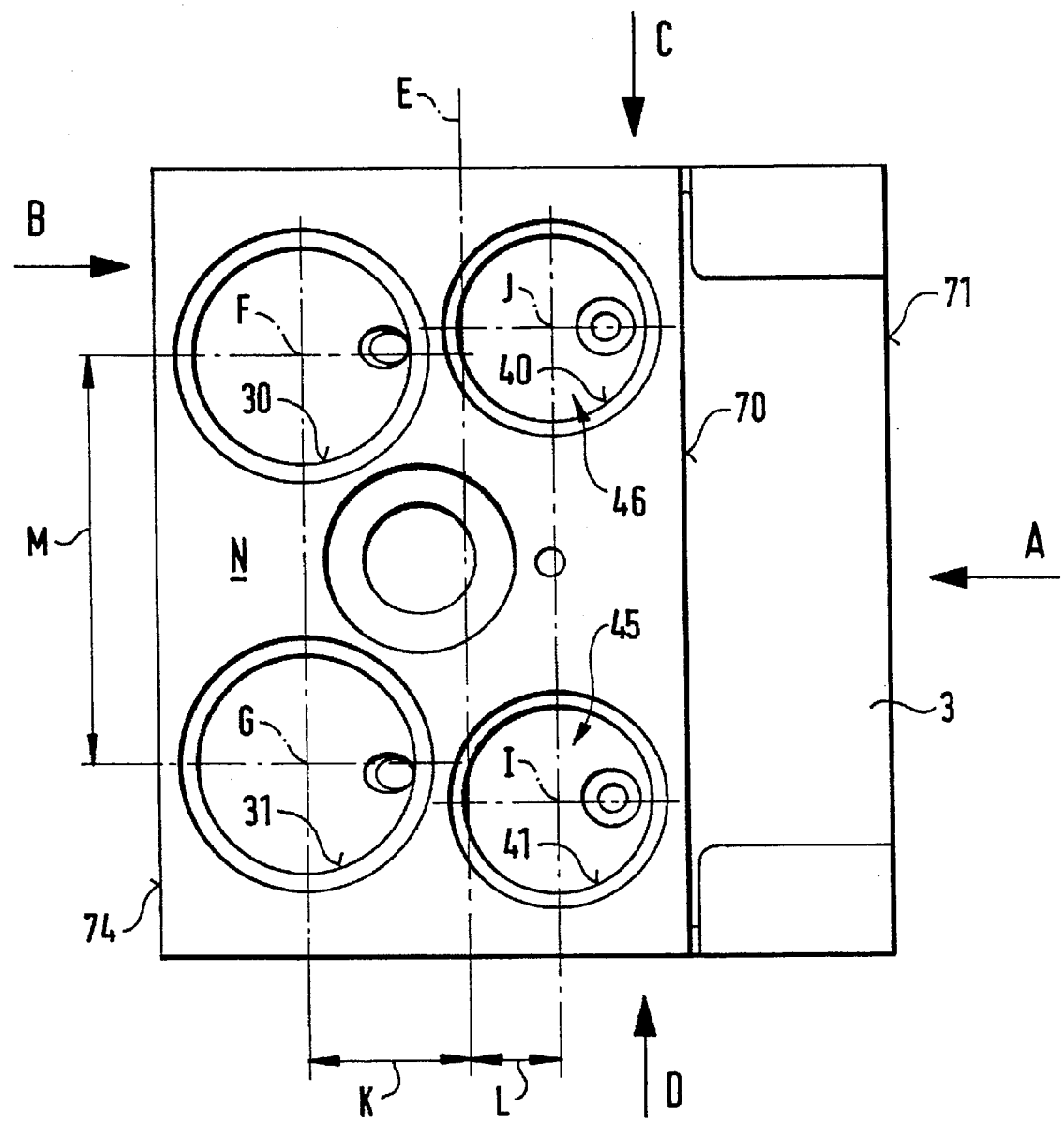
FIG. 6 shows a bottom view of the housing block, essential to the invention, of the anti-lock device.

The distances of the longitudinal axes F, G, I, J relative to the common longitudinal axes E of the pump pistons 20, 21 can be seen particularly clearly in FIG. 6 which shows a bottom view of the housing block 3. In FIG. 6, once again the horizontal distances K and L can be found. Furthermore, the horizontal distance M can be found again, as assigned, in FIG. 5, to the first storage chambers 38, 39. In the example of FIG. 6, the axes I and J of the second storage chambers 45, 46 and therefore the associated bores 40 and 41 are further away from one another than the bores 30 and 31 of the first storage chambers 38, 39. A rectangle defined by the longitudinal axes F, G, I and J is therefore designed here as a symmetrical trapezium. However, the invention is not restricted to the arrangement at corners of a trapezium, but on the contrary the designer can, according to choice, select the distances between the first bores 30, 31 and the second bores 40, 41 so as to be the same size, so that the longitudinal axes F, G, I and J delimit either a rectangle or a square.

Figure 7:
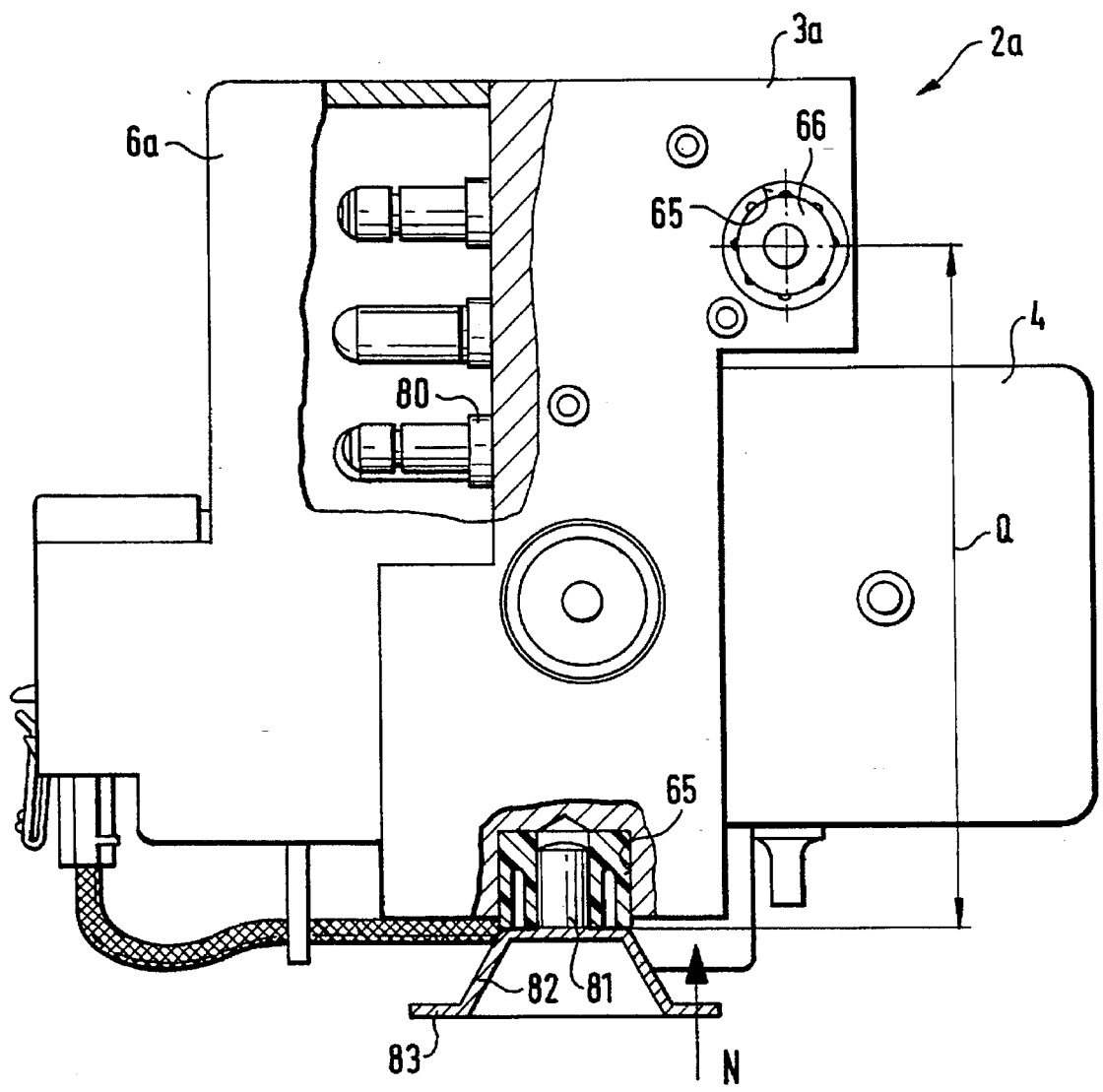
FIG. 7 shows a development of the anti-lock device according to the invention, additionally for automatic braking.
Figure 8:
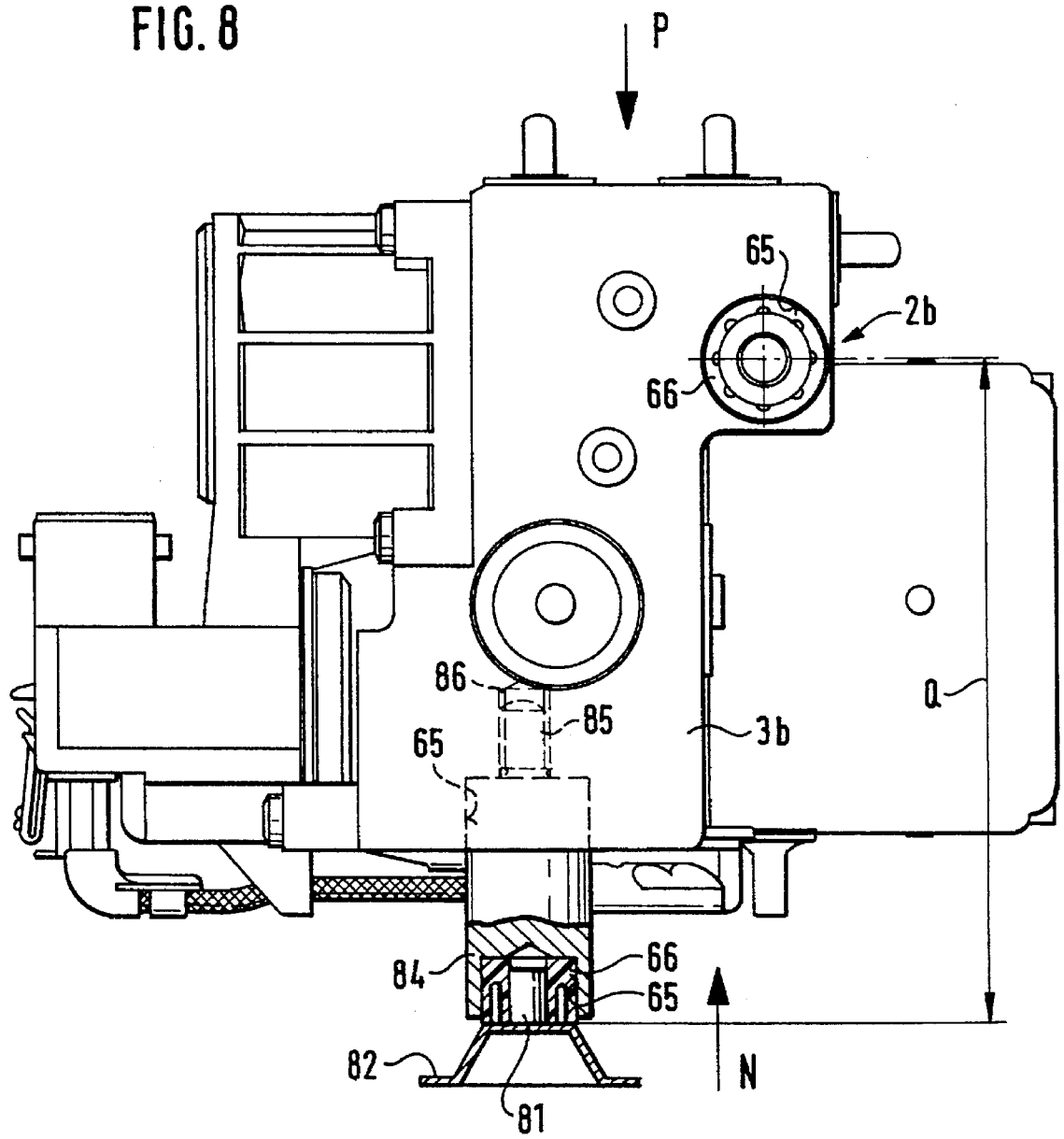
FIG. 8 shows a design, varied in detail, of the housing block of an anti-lock device, as shown in FIG. 1.

The anti-lock device 2a according to FIG. 7 differs from the anti-lock device 2 according to FIG. essentially in that further directional valves 80 are installed in a further horizontal plane. For this purpose, the housing block 3a is made taller than the housing block 3 according to FIG. 1. In a way known per se, the additional directional valves 80 are used to provide brake pressures automatically, that is to say to brake when the driver has not intended or initiated any braking. As already contained in the specified prior art, this automatic braking can serve for regulating the wheel slip of drivable automobile wheels. An example of the hydraulic interlinking of all the directional valves is contained in said prior art, so that there is no need for any more detailed explanation here.

In the same way as in the exemplary embodiment according to FIG. 1, a blindhole-like recess 65 in the housing block 3a is likewise provided from the underside N in the development according to FIG. 7. This blindhole-like recess 65 likewise receives an elastomeric element 66. In a vehicle to be equipped with it, the lower elastomeric element 66 is assigned, in the vehicle, a tenon 81 penetrating into the elastomeric element 66 and a base 82 formed, for example, from sheet metal. For example, the base 82 has an annular flange 83 which can be welded to a wall or a floor of the vehicle, not shown. The tenon 81 can be butt-welded against the base 82, for example by electric resistance welding or by friction welding.

The base 82 and its tenon 81 can also be used in conjunction with the exemplary embodiment according to FIG. 1.

If one and the same body type is to be equipped differently, in particular, on the one hand, with an anti-lock device, such as corresponds fundamentally and with the same function to the design of FIG. 1, and, on the other hand, with a developed anti-lock device 2a according to FIG. 7, then the base 82 can be fastened in the body in a way intended for the developed anti-lock device 2a according to FIG. 7 and the non-developed anti-lock device can be combined with a column 84. The column 84 has once again, from its underside, an essentially blindhole-like recess 65, into which an elastomeric element 66 is again inserted. For example, the column 84 can be screwed to an anti-lock device 2b adapted to it. For this purpose, the column 84 can have a threaded tenon 85, to which a threaded hole 86 is assigned in the modified housing block 3b. This threaded hole 86 can be connected, for example, to a blindhole-like recess 65 which can be transferred out of the housing block 3.

In the assembled state, there is a vertical distance Q between the base 82 and the paired recesses 65. To illustrate the idea of the invention, this vertical distance Q is also shown in the developed anti-lock device 2a of FIG. 7 with the taller housing block 3a. The above-described exemplary embodiment of a housing block 3b then also has the advantage that the associated anti-lock device 2b can be installed either without or with the column 84 in a body.

The foregoing relates to preferred exemplary embodiments of the invention, it being understood that other variants and embodiments thereof are possible within the spirit and scope of the invention, the latter being defined by the appended claims.

We claim:

1. An anti-lock device for a hydraulic vehicle brake system, comprising a housing block which has brake-conduit connecting holes and, starting from a first housing block side (A), an eccentric space, an eccentric rotatably mounted about an axis of rotation in the eccentric space, first and second pump pistons oriented coaxially and mirror-symmetrically to the eccentric and displaceable along a first longitudinal axes (E), a motor for driving the eccentric, the motor being, oriented coaxially to the axis of rotation of the eccentric and fastened to the first housing block side, with a second housing block side which is located opposite the first housing block side and starting from the second housing block side electrically controllable directional valves for a variation of wheel brake pressures are installed parallel to the axis of rotation of the eccentric, first and second storage chambers, located in first and second bores, for a temporary reception of a pressure medium pumped by the first and second pump pistons, extensions of second and third longitudinal axes (F, G) of the first and second storage chambers being oriented in parallel and intersecting first longitudinal axes of the first and second pump pistons at right angles, and at least one cover cap for electromagnet elements, wherein an extension of the second and third longitudinal axes (F, G) of the first and second storage chambers (38, 39) are at a first distance (K) from the first longitudinal axes (E) of the first and second pump pistons (21, 22) and fourth and fifth longitudinal axes (I, J) of third and fourth storage chambers (45, 46) which are at a second distance (L) from the first longitudinal axes (E) of the first and second pump pistons (20, 21), said third and fourth storage chambers are located in third and fourth bores.

2. The anti-lock device as claimed in claim 1, wherein the first distances (K) of the second and third longitudinal axes (F, G) are identical to one another, and wherein the second distances (L) of the fourth and fifth longitudinal axes are identical to one another.

3. The anti-lock device as claimed in claim 2, wherein the first longitudinal axes (E) of the first and fifth pump pistons (21, 22) are located between the third and fourth longitudinal axes (G, I) of a second storage chamber (39) and of a third storage chamber (45).

4. The anti-lock device as claimed in claim 3, wherein a projection of the second, third, fourth and fifth longitudinal axes (F, G, I, J) of the first, second, third and fourth storage chambers (38, 39, 45, 46) determines four corner points of a symmetrical quadrangle.

5. The anti-lock device as claimed in claim 3, wherein a side (N) of the housing block (3), from which the first, second, third and fourth bores (30, 31, 31', 41) start, forms an underside of the housing block (3), and wherein first, second, third and fourth brake conduit connecting holes (56, 58, 60, 61) are located on an upper side (P) of the housing block (3).

6. The anti-lock device as claimed in claim 2, wherein a projection of the second, third, fourth and fifth longitudinal axes (F, G, I, J) of the first, second, third and fourth storage chambers (38, 39, 45, 46) determines four corner points of a symmetrical quadrangle.

7. The anti-lock device as claimed in claim 2, wherein a side (N) of the housing block (3), from which the first, second, third and fourth bores (30, 31, 31', 41) start, forms an underside of the housing block (3), and wherein first, second, third and fourth brake conduit connecting holes (56, 58, 60, 61) are located on an upper side (P) of the housing block (3).

8. The anti-lock device as claimed in claim 1, wherein the first longitudinal axes (E) of the first and second pump pistons (21, 22) are located between the third and fifth longitudinal axes (G, I) of a second storage chamber (39) and of a third storage chamber (45).

9. The anti-lock device as claimed in claim 8, wherein a projection of the second, third, fourth and fifth longitudinal axes (F, G, I, J) of the first, second, third and fourth storage chambers (38, 39, 45, 46) determines four corner points of a symmetrical quadrangle.

10. The anti-lock device as claimed in claim 8, wherein a side (N) of the housing block (3), from which the first, second, third and fourth bores (30, 31, 31', 41) start, forms an underside of the housing block (3), and wherein first, second, third and fourth brake conduit connecting holes (56, 58, 60, 61) are located on an upper side (P) of the housing block (3).

11. The anti-lock device as claimed in claim 1, wherein a projection of the second, third, fourth and fifth longitudinal axes (F, G, I, J) of the first, second, third and fourth storage chambers (38, 39, 45, 46) determines four corner points of a symmetrical quadrangle.

12. The anti-lock device as claimed in claim 11, wherein the four corner points belong to a rectangle.

13. The anti-lock device as claimed in claim 1, wherein a side (N) of the housing block (3), from which the first, second, third and fourth bores (30, 31, 31', 41) start, forms an underside of the housing block (3), and wherein first, second, third and fourth brake conduit connecting holes (56, 58, 60, 61) are located on an upper side (P) of the housing block (3).

14. The anti-lock device as claimed in claim 13, wherein the first side (A) of the housing block (3) has a first fastening surface (70) assigned to the motor (4), and wherein there is above the motor (4) a second surface (71) which is offset relative to the first fastening surface (70) of the motor (4) in parallel in a direction of a free end of the motor (4) and from which fifth and sixth brake conduit connecting holes (57, 59) start.

15. The anti-lock device as claimed in claim 14, wherein the housing block (3) has on a second side (B), in a region of first and second directional valves (51, 53), a first vertical surface (73) with a first horizontal distance from the first longitudinal axes (E) of the pump pistons (20, 21) and, underneath this, a second surface (74) having at least a height corresponding to a height of the first and second storage chambers (38, 39) and with a second horizontal distance from the first longitudinal axes (E) of the pump pistons (20, 21) which is greater than the first distance.

16. The anti-lock device as claimed in claim 13, wherein the housing block (3) has on a second side (B), in a region of first and second directional valves (51, 53), a first vertical surface (73) with a first horizontal distance from the first longitudinal axes (E) of the pump pistons (20, 21) and, underneath this, a second surface (74) having at least a height corresponding to a height of the first and second storage chambers (38, 39) and with a second horizontal distance from the first longitudinal axes (E) of the pump pistons (20, 21) which is greater than the first distance.

17. The anti-lock device as claimed in claim 16, wherein a housing (5) is arranged on the lower surface (74) for receiving electric and/or electronic components.

18. The anti-lock device as claimed in claim 16, wherein a cover cap (6), which covers at least electromagnetic coils (54, 55) of the first and second directional valves (51, 53), is mounted on the upper surface (73).

19. The anti-lock device as claimed in claim 1, wherein parallel to the first longitudinal axes (E) of the pump pistons (20, 21) and at the same time above a longitudinal axis of the motor (4), the housing block (3) has, on two opposite sides (C, D), first and second blindhole-like recess (65), and, on a lower side (N), a third blindhole-like recess (65), each for a first, second and third elastomeric element (66) for a suspension of an anti-lock device (2, 2a).

20. The anti-lock device as claimed in claim 1, wherein the anti-lock device (2a) is developed for automatic braking by means of additionally installed electrically controllable directional valves (80) and a housing block (3a) designed for this purpose.

21. The anti-lock device as claimed in claim 20, wherein, parallel to the first longitudinal axes (E) of the pump pistons (20, 21) and at the same time above a sixth longitudinal axis (8) of the motor (4) on two opposite sides of the housing block (3a), fourth and fifth blindhole-like recesses (65) are provided for fourth and fifth elastomeric suspension elements (66) and, starting from the lower side (N) of the housing block (3), a sixth recess (65) is provided for a sixth elastomeric element (66).

22. The anti-lock device as claimed in claim 1, wherein blindhole-recesses (65) for receiving elastomeric elements (66) are arranged parallel to the first longitudinal axes (E) of the pump pistons (20, 21) and at the same time above the longitudinal axis of the motor (4) on two opposite sides (C, D) of the housing block (3b), wherein a column (84) is connected to the housing block (3b), from a lower side (N), and wherein the column (84) has at the bottom a seventh blindhole-like recess (65) for receiving a seventh elastomeric element (66).

* * * * *